United States Patent
Santoro et al.

(10) Patent No.: US 7,663,480 B2
(45) Date of Patent: Feb. 16, 2010

(54) WIRE EMULATION THROUGH A NETWORK FOR PROPAGATION OF FAILURE INFORMATION

(75) Inventors: Philip J. Santoro, North Riverside, IL (US); Robert D. Gatze, Aurora, IL (US); Gregory V. Degnan, Naperville, IL (US); Eric L. Chan, Naperville, IL (US); Weiying Cheng, Naperville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 384 days.

(21) Appl. No.: 11/652,796

(22) Filed: Jan. 12, 2007

(65) Prior Publication Data

US 2008/0170852 A1   Jul. 17, 2008

(51) Int. Cl.
*G08B 1/00* (2006.01)
(52) U.S. Cl. .................. 340/531; 340/507; 340/3.1; 340/825.36; 340/825.49
(58) Field of Classification Search .............. 340/506, 340/507, 517, 521, 524, 525, 3.1, 825.36, 340/825.49
See application file for complete search history.

(56) References Cited

U.S. PATENT DOCUMENTS 5,400,246 A * 3/1995 Wilson et al. ............... 700/17

7,113,699 B1   9/2006 Bhate et al. ................. 398/15

OTHER PUBLICATIONS

"Troubleshooting Physical Layer Alarms on SONET and SDH Links", http://www.cisco.com/warp/public/127/sonetalarms_16154.pdf, Oct. 24, 2006.
"Configuring Transponder Line Card Interfaces", http://www.cisco.com/univercd/cc/td/doc/product/mels/15530/12c_ev1/config/hcg_tran.pdf, Jul. 16, 2003.

* cited by examiner

*Primary Examiner*—Daryl Pope
(74) *Attorney, Agent, or Firm*—Fitzpatrick, Cella, Harper & Scinto (57) ABSTRACT

An optical transponder, system, method, and program wherein the transponder monitors for at least one of a failure or an alarm signal. In response to detecting a failure or alarm signal (communication), the transponder performs at least one of a predetermined action and propagating an alarm communication to a network, based on a configuration property. The transponder can have a configuration property specifying a predetermined action for shutting off a laser if an alarm signal indicating a network failure is detected. As an example, some transponders can be configured to either provide an alarm communication, and/or shut off a laser, depending upon which communication interface detects a network failure or receives an alarm signal. Also, other transponders can be configured to propagate existing alarm communications, without generating new alarm communications or shutting off lasers. In this manner, the number of alarm signals and laser shut offs can be reduced when a network failure is propagated through the network.

17 Claims, 9 Drawing Sheets

*(PRIOR ART)*

WIRE EMULATION THROUGH A NETWORK FOR PROPAGATION OF FAILURE INFORMATION

BACKGROUND OF THE INVENTION

1. Field of the Invention

The invention relates to network device maintenance and more specifically to propagating failure information to network transponders.

2. Description of the Related Art

Figure 9:
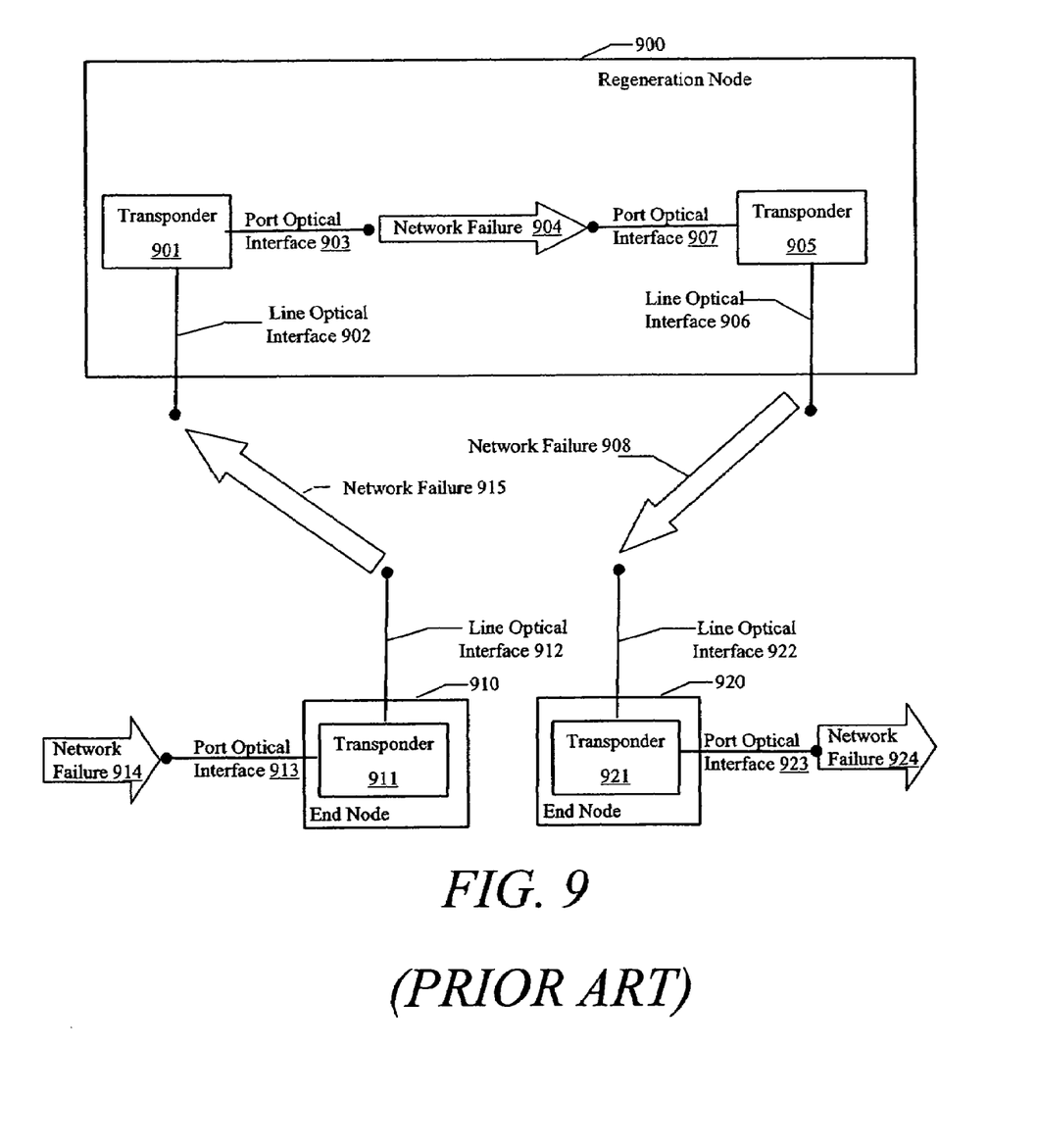
FIG. 9 is a flow diagram depicting the propagation of a network failure through a network in accordance with prior art.

Optical networks can be used to connect subscribers of telecommunication services to telecommunication service providers. The communication link between a subscriber and a service provider is typically created by connecting an end node at the subscriber's location to an end node at a service provider's location, via a communication line, such as a fiber optic cable. FIG. 9 is an example of a typical optical network that can be used to connect subscribers of telecommunication services to telecommunication service providers. One end node, such as end node 910 could be located at the subscriber's location, and another end node, such as end node 920, could be located at the service provider's location.

Because a subscriber's location and a service provider's location can be separated by long distances, the communication signal may degrade as it passes through the communication line. To overcome signal degradation, regeneration nodes, such as regeneration node 900, can be positioned between the end nodes. Regeneration nodes can overcome signal degradation by generating a new signal based on the signal received via the communication line, and propagating the new signal through the network.

End nodes and regeneration nodes include optical transponders for sending and receiving optical signals. Each transponder typically has port optical interfaces and line optical interfaces, each interface having lasers used for sending optical signals. To decrease unnecessary energy usage and reduce unnecessary safety risks, optical transponders can be configured to shut off a laser if a network failure is detected. In particular, a transponder does not distinguish between a network failure detected at a port interface versus those detected at a line interface, and thus they do not take specific actions based on any such distinctions.

FIG. 9 shows the propagation of a network failure through a network in accordance with prior art. Transponders 901, 905, 911, and 921 are configured to generate an alarm signal and shut off a laser if a network failure is detected at a communication interface. Transponder 911 detects a network failure at port optical interface 913 and responds by generating an alarm signal. Transponder 911 then shuts off the laser of line optical interface 912.

Once the laser of line optical interface 912 is shut off, transponder 911 no longer sends signals from line optical interface 912, and network failure 915 occurs. Transponder 901 then detects network failure 915, generates an alarm signal, and shuts off the laser of port optical interface 903, thereby creating network failure 904. Transponder 905 then detects network failure 904, generates an alarm signal, and shuts off the laser of line optical interface 906, thereby creating network failure 908. Finally, transponder 921 detects network failure 908, generates an alarm signal, and shuts off the laser of port optical interface 923, thereby creating network failure 924. In this manner, a network failure is propagated through the network.

The alarm signals generated by the transponders are detected by a network management application used by the service provider to monitor and manage the network. In the previous example, the network management application would detect multiple alarm signals for the propagation of a single network failure through the network.

A problem with the laser shut off action performed in the prior art is the additional management overhead created by processing redundant alarm signals and reactivating multiple lasers, for a single network failure. Also, in the prior art the transponders do not distinguish between network failures detected at a port interface versus those detected at a line interface, and thus they do not take specific actions based on any such distinctions.

There exists a need, therefore, for an improved technique for responding to network failures, that reduces both the number of alarm signals that are generated and the number of laser shut off actions that are effected in response to the failures.

SUMMARY OF THE INVENTION

The foregoing and other problems are overcome by a method for operating an optical transponder, having plural communication interfaces, which can communicate with a network, and by an optical transponder (apparatus), system, and computer program that operate in accordance with the method. The method monitors the communication interfaces for at least one of a failure or an alarm signal (communication), and, in response to detecting a failure or alarm signal through any communication interface, performs at least one of a predetermined action and providing an alarm communication, based on a configuration property and the communication interface through which the failure or alarm signal is detected, wherein the configuration property specifies at least one of the providing and the predetermined action.

According to one exemplary embodiment of the invention, the predetermined action is either a configurable action or a default action. The default action can be, for example, performing an action defined by a network protocol. The transponder preferably includes at least first and second communication interfaces. The first and second communication interfaces preferably are optical communication interfaces, and each comprise, for example, at least one of an optical transmitter unit and an optical receiver unit.

Also according to an exemplary embodiment of the invention, the optical transmitter unit includes a laser.

According to an aspect of at least one embodiment of the invention, the configurable action includes at least one of providing an alarm from the transponder if a failure or an alarm signal is detected by way of the first interface, and shutting off a laser if a failure or an alarm signal is detected by way of the second interface.

According to another aspect, the configuration property can specify at least one of, for example, a configurable action value for performing a configurable action, a "not applicable" value for performing a default action, or a propagation value for propagating an alarm communication.

As an example, transponders in end nodes can be configured such that they either provide an alarm communication, or shut off a laser, depending upon which interface detects a network failure or receives an alarm signal. Also, transponders in regeneration nodes can be configured such that they propagate existing alarm communications, with or without generating new alarm communications or shutting off lasers. In this manner, the number of alarm signals and laser shut off actions can be reduced when a network failure is propagated through the network.

This brief summary has been provided so that the nature of the invention may be understood quickly. A more complete understanding of the invention can be obtained by reference to the following detailed description, appended claims, and accompanying drawings.

BRIEF DESCRIPTION OF THE DRAWINGS

The invention will be more readily understood from a detailed description of the invention taken in conjunction with the following figures.

Identically labeled elements appearing in different ones of the figures refer to the same elements but may not be referenced in the description for all figures.

DETAILED DESCRIPTION OF THE PREFERRED EMBODIMENTS

Figure 1:
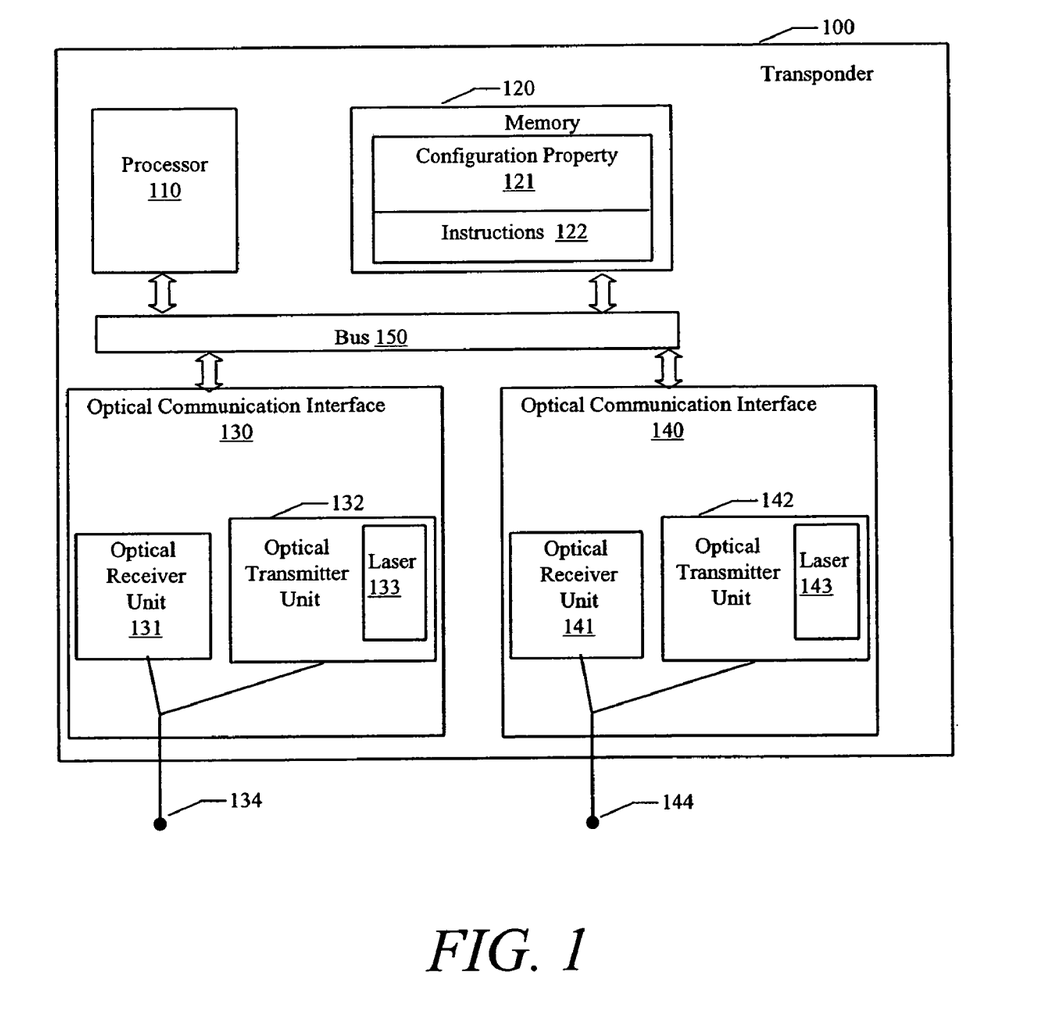
FIG. 1 is an architecture diagram of a transponder in accordance with an exemplary embodiment of the invention.

FIG. 1 is an architecture diagram of a transponder in accordance with an exemplary embodiment of the invention. Transponder 100 includes a processor, such as processor 110, a bus, such as bus 150, a memory, such as memory 120, and communication interfaces, such as optical communication interface 130 and optical communication interface 140. Processor 110, memory 120, optical communication interface 130, and optical communication interface 140 are all interconnected via bus 150.

Memory 120 stores a configuration property, such as configuration property 121, and instructions, such as instructions 122. Configuration property 121 can be set either manually or automatically by a network management application (not shown) of an overall network management controller (not shown) and/or the transponder 100. For example, processor 110 can process instructions for setting configuration property 121 specified manually by an operator through a user interface (not shown). Also by example, processor 100 can process instructions for setting configuration property 121, received from a network management application via either optical communication interface 130 or 140.

Preferably, the value of configuration property 121 for a specific transponder is determined based on the position of transponder 100 in a network and/or applicable network operating criteria. For example, a transponder positioned as part of a regeneration node may have its configuration property 121 set to a value to enable the transponder to propagate an alarm signal through a network with or without shutting off a laser, if the transponder detects an alarm signal or network failure, whereas a transponder positioned as part of an end node may have its configuration property 121 set to a value to enable the transponder to shut off a laser and/or provide an alarm signal, if it detects a network failure or alarm signal, although in other examples, the configuration properties 121 of those nodes may be set to other appropriate values to be described below.

According to a preferred embodiment of the invention, configuration property 121 can be set to, for example, one or more of (1) a configurable action value for performing a configurable action, (2) a propagation value for propagating an alarm signal (communication), (3) a "not applicable" value for performing a default action, and any other predetermined value specifying how the transponder 100 should proceed to operate in response to a predetermined event occurring. A configurable action can be, for example, an action for shutting off the laser of a transponder's port interface if a detected network failure or an alarm signal is obtained by way of the transponder's line interface (or vice versa), and/or providing an alarm communication through the line interface if the detected network failure or alarm signal is obtained through the port interface (or vice versa), or some other predetermined action. The default action can be, for example, performing an action based on a network protocol, such as SONET (Synchronous Optical Network), SDH (Synchronous Digital Hierarchy), Gigabit Ethernet, Fibre Channel, and the like. For example, the Fibre Channel protocol specifies an action for shutting off an interface's transmission laser if the interface detects a loss of signal.

Instructions 122 include instructions for performing configurable actions, propagating an alarm signal, and performing a default action, for example. Memory 120 also stores routines and operating programs for controlling the overall operation of the transponder 100, and for performing methods described herein below in conjunction with FIG. 5, FIG. 6 and/or FIG. 7. Those routines and programs can include the executable instructions 122.

Optical communication interfaces 130 and 140 are bidirectional fiber optic interfaces or other suitable types of optical communication interfaces, depending on the application of interest. Optical communication interfaces 130 and 140 can include, for example, an optical receiver unit, such as optical receiver units 131 and 141, and an optical transmitter unit, such as optical transmitter units 132 and 142. Optical receiver units 131 and 141 may be a photo detector or another kind of optical receiver unit. Optical transmitter units 132 and 142 include a laser, such as lasers 133 and 143, or another suitable type of optical transmitter. Interface connectors 134 and 144 can be any suitable type of interface connectors that are capable of connecting optical interfaces, including fiber optic connectors and the like.

Transponder 100 receives data, network failures, status messages, and maintenance instructions via either optical communication interface 130 or 140. Processor 110 then processes data, network failures, status messages, and maintenance instructions in accordance with the instructions 122 and configuration property 121 stored in memory 120. Transponder 100 may send data, status messages, and maintenance instructions via either optical communication interface 130 or 140. Preferably, the transponder 100 communicates using a predetermined network protocol, such as, for example, SONET, SDH, Gigabit Ethernet, Fibre Channel, or any other type of protocol, depending on the application of interest.

Processor 110 can generate and detect alarm signals. For example, processor 110 can detect alarm signals by comparing the value of a status message received through a receiver unit to the value of an alarm signal predefined by the network protocol used by transponder 100, to determine whether those values are substantially the same (which indicates that the status message includes an alarm signal), or by employing any other suitable technique for detecting alarm signals. The processor 110 also can cause the transponder 100 to operate in a predetermined manner (e.g., such as by generating and/or providing an alarm signal or taking another action) in response to the detection, depending on configuration property 121, as will be described in more detail below.

Optical receiver units 131 and 141 can decode optical signals received via optical interfaces 130 and 140 to obtain corresponding decoded signals. Optical receiver units 131 and 141 (and/or processor 110) can detect network failures using any suitable known failure detection technique, such as by detecting an absence of light (loss of signal), absence of one or more frames, a failure to synchronize with a received signal, bit errors in the received signals, a trace identifier mismatch, and the like, in which case the processor 110, notified of the failure, causes the transponder 100 to operate in a predetermined manner, depending on configuration property 121. Also under control of processor 110, optical transmitter units 132 and 142 can send optical signals via optical communication interfaces 130 and 140 by activating lasers 133 and 143 respectively. Thus, the processor 110 controls activation and deactivation of the lasers 133 and 143.

Figure 2:
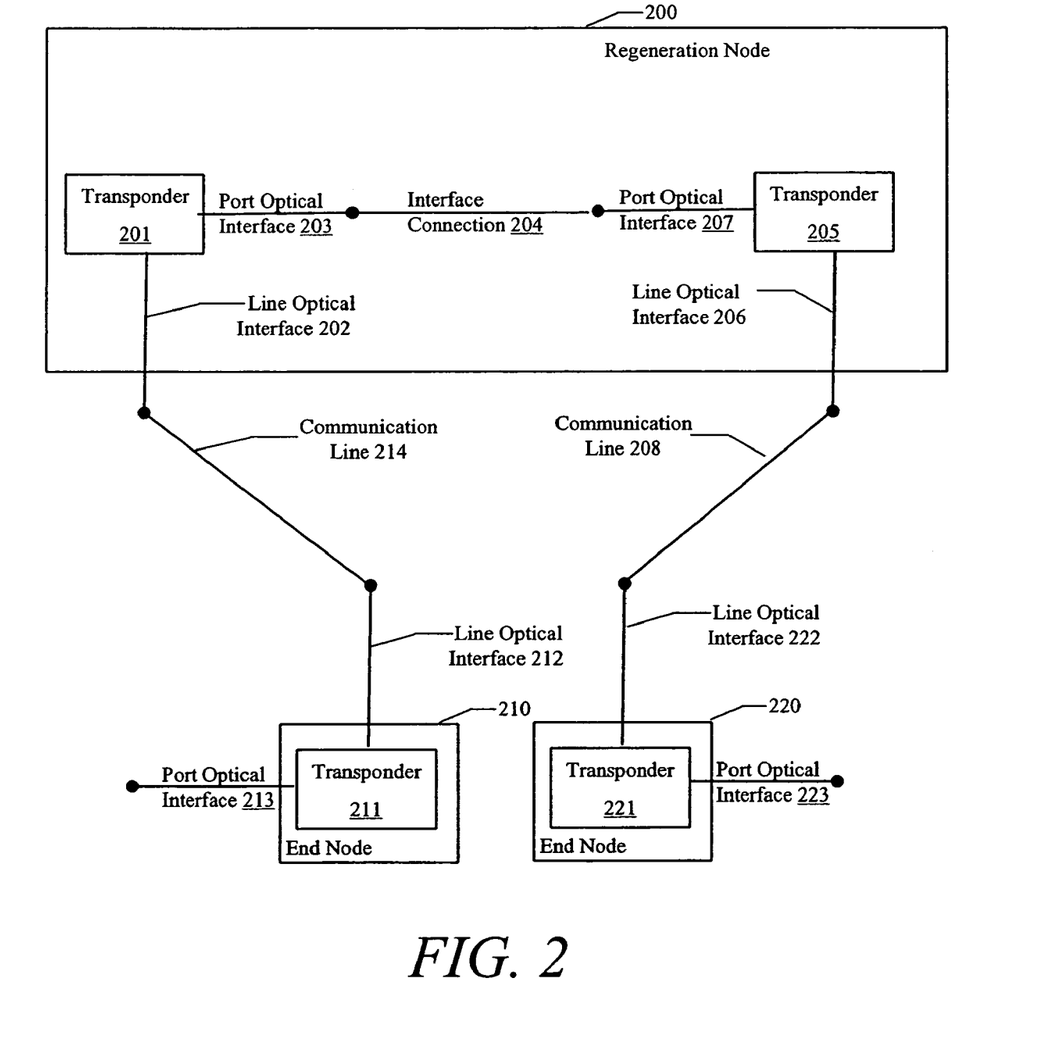
FIG. 2 is a network diagram depicting transponders configured in a network in accordance with an exemplary embodiment of the invention.

Having described the architecture of a transponder in accordance with an exemplary embodiment of the invention, an additional aspect of the invention will now be described with reference to FIG. 2. FIG. 2 is a network diagram depicting transponders configured in a network in accordance with an exemplary embodiment of the invention. The network includes at least one regeneration node and end nodes, such as regeneration node 200, and end nodes 210 and 220, although in other embodiments, more or less than the depicted number of nodes may be employed. Regeneration nodes and end nodes can each be connected to one or more other network devices (not shown). The network can be, for example, a fiber optic network, used to send communications from a client (not shown) at one end of the network to another remote client (not shown) at another end of the network.

A client can be, for example, a computer, a set top box, a telephone switch, a central office switch for telephones, a digital cross-connect switch, and the like. A network end node, such as end nodes 210 and 220, connects to the client to enable the client to send communications through the network to another one of the end nodes, connected to another client. Communications from one end node are sent to the other end node via a communication line, such as communication lines 208 and 214. Communication lines 208 and 214 can be any suitable type of communication line or equipment capable of connecting end nodes, including one or more fiber optic cables, and the like. If communication lines span long distances, such as, for example, hundreds of miles, the network may experience signal degradation across the communication lines. One or more regeneration nodes, such as regeneration node 200, can be positioned between the end nodes to overcome signal degradation by propagating a signal based on a signal received via a communication line, with or without generating a new signal, so that the signal is supplied through the network towards its intended destination.

Each node 200, 210, and 220 includes transponders which each may be the same as the transponder 100 depicted in FIG. 1. Each transponder has one or more line interfaces, such as line optical interfaces 202, 206, 212, and 222, for interconnecting with corresponding communication lines 208 and 214 as shown in FIG. 2. Also, each transponder has one or more port interfaces. In the illustrated embodiment, port optical interfaces 203 and 207 are shown which interconnect the transponders 201 and 205 via interface connection 204. Also in the illustrated embodiment, transponders of end nodes 210 and 220 have a respective port interface 213, 223 that can connect to a corresponding client (not shown), and a respective line interface 212, 222 for connecting to a corresponding line interface 202, 206 of a transponder 201, 205, respectively.

Each node 200, 210, and 220 can be configured to operate in a predetermined manner in response to the detection of a predetermined failure or alarm signal. For example, an end node can be configured to shut off its respective port interface 213, 223 (or line interface), if a network failure or alarm signal is detected on a corresponding communication line 214, 208 (or port interface), and/or to provide an alarm communication through its line interface 212, 222 (or port interface) if the failure or alarm signal is detected by way of the port interface 213, 223 (or line interface). Regeneration node 200 can be configured to shut off its corresponding line interface 202, 206 (or port interface), if a network failure or alarm signal is detected on a corresponding port interface 203, 207 (or line interface), and/or to generate an alarm communication through one of those interfaces if the failure or alarm signal is detected by way of the other interface. The node 200 also can be configured to forward a received alarm signal without generating a new one. Nodes can be configured by setting the configuration properties of the transponders of the nodes in the above-described manner, based on the type and location of the node in the network and/or other predetermined operating criteria.

In the illustrated embodiment, regeneration node 200 is connected to the end node 210 and end node 220 as described above. End nodes 210 and 220 include transponders 211 and 221, respectively, which each may be the same as the transponder 100 depicted in FIG. 1. End nodes 210 and 220 include port optical interfaces 213 and 223, respectively, and line optical interfaces 212 and 222, respectively.

Regeneration node 200 includes two or more transponders 201 and 205, which also each may be the same as the transponder 100 depicted in FIG. 1. Regeneration node 200 includes the line optical interfaces 202 and 206. Transponders 201 and 205 are interconnected via port optical interfaces 203 and 207 by way of the interface connection 204, which can be any suitable type of interface connection capable of connecting optical interfaces, including one or more fiber optic cables, and the like.

Regeneration node 200 is connected to end node 210 via the line optical interfaces 202 and 212. A communication line, such as communication line 214, connects line optical interfaces 202 and 212. Communication line 214 can be any communication line or equipment capable of connecting optical interfaces including one or more fiber optic cables, and the like.

Regeneration node 200 is also connected to the end node 220 via line optical interfaces, such as the line optical interfaces 206 and 222. Communication line 208 connects line optical interfaces 206 and 222. Communication line 208 can be any communication line or equipment capable of connecting optical interfaces including one or more fiber optic cables, and the like.

Regeneration node 200 sends data, status messages, and maintenance instructions to either end nodes 210 or 220. End nodes 210 and 220 send data, status messages, and maintenance instructions to each other via regeneration node 200.

Figure 3:
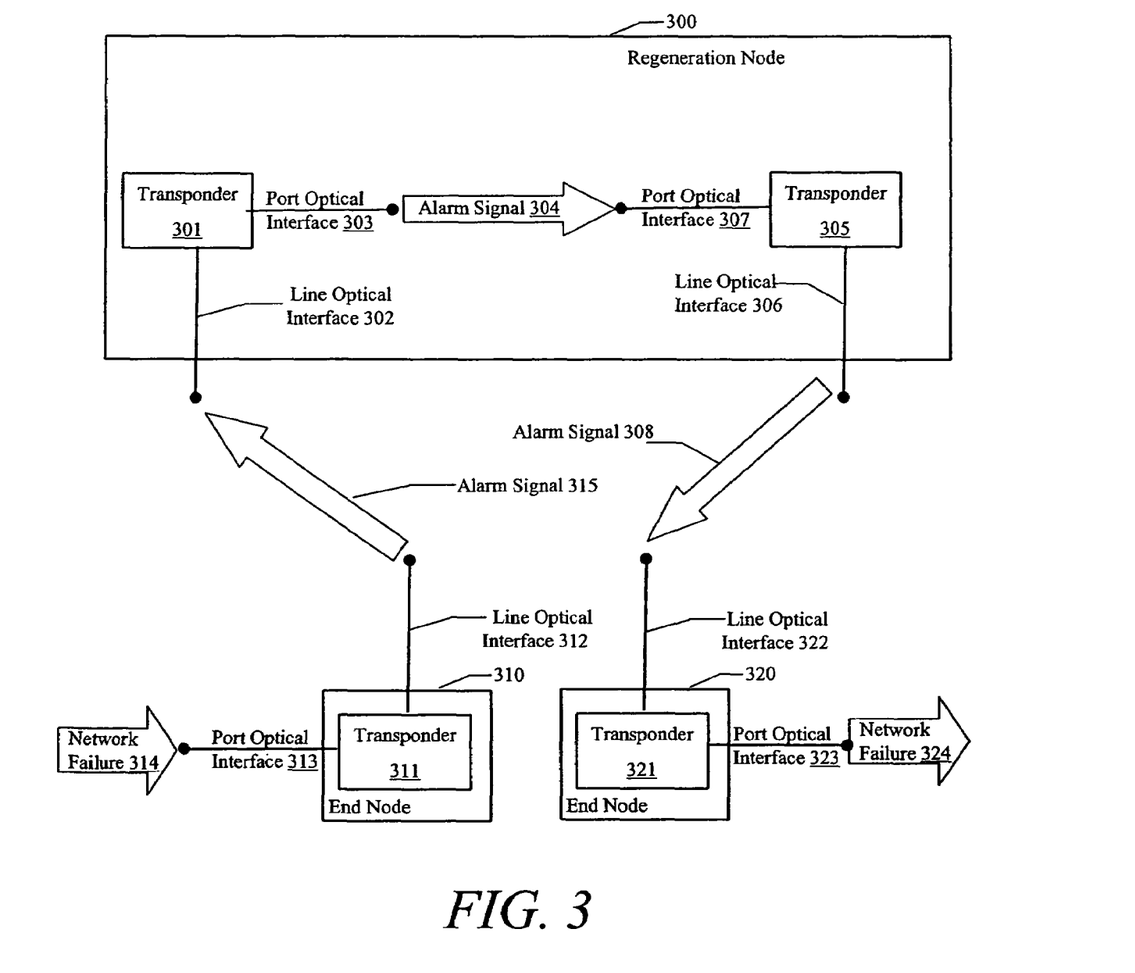
FIG. 3 is a flow diagram depicting the propagation of an alarm signal resulting from a network failure, through a network in accordance with an exemplary embodiment of the invention.

Having described a diagram depicting transponders configured in a network in accordance with an exemplary embodiment of the invention, FIG. 3 will now be described. FIG. 3 is a flow diagram depicting the propagation of an alarm signal resulting from a network failure, through the network, in accordance with an exemplary embodiment of the invention. Network failures 314 and 324 can include loss of signal, loss of frame, or any other type of failures identified above, although they also may include other predetermined types of failures as well, or in lieu of those described herein. Alarm signals 304, 308, and 315 are indicator signals, such as SONET AIS, proprietary alarm indicator signals, and the like, or any other suitable type of alarm signal, depending on the supported network protocol.

According to an exemplary embodiment, regeneration node 300 is the same as regeneration node 200 shown in FIG. 2 and end nodes 310 and 320 are the same as end nodes 210 and 220 shown in FIG. 2, although in other embodiments the nodes 300, 310, and 320 may have other configurations. Regeneration node 300 includes two or more transponders 301 and 305 that may be similar to transponder 100 of FIG. 1. Transponders 301 and 305 are interconnected via port optical interfaces 303 and 307. Regeneration node 300 is connected to end node 310 via line optical interfaces 302 and 312. Regeneration node 300 also is connected to end node 320 via line optical interfaces 306 and 322. End nodes 310 and 320 may be connected to other network devices (e.g., client equipment) as described above via port interfaces 313 and 323, respectively.

In the present example, end nodes 310 and 320 are configured (by virtue of their configuration property 121) to shut off their respective port interfaces 313 and 323, if a network failure or an alarm signal is detected on a communication line, and each also is configured to generate and send an alarm signal to instruct the other node to shut off its port interface if the instructing node detects a failure or alarm signal at its port interface. Regeneration node 300 is configured to propagate an alarm signal 315 generated by end node 310 to end node 320, or to propagate an alarm signal (not shown) generated by end node 320 to end node 310, without regenerating a new alarm signal in either case. In other words, the node 300 simply forwards the same alarm signal which it receives from an end node, to the destination end node.

In accordance with the foregoing examples, transponders 301 and 305 have their configuration properties 121 set to a propagation value for propagating alarm signals so that alarm signals can be forwarded to the destination end node 310 or 320, without regenerating new alarm signals. Transponders 311 and 321 each have their configuration properties 121 set to an action value specifying that the transponder provide an alarm communication through its line interface if a network failure or alarm signal is detected at its port interface, or shut off a laser of its port interface if a network failure or alarm signal is detected at its line interface. The process for these actions will be described in more detail below in the detailed description of FIG. 6.

In operation, transponder 311 detects network failure 314 in the above-described manner, and then responds by processing the network failure 314 in accordance with the value of transponder 311's configuration property. Since in this example transponder 311's configuration property is set to a configurable action value wherein transponder 311 provides an alarm communication through its line interface 312 if port interface 313 detects a network failure or alarm signal, transponder 311 then provides alarm signal 315 to transponder 301, through interface 312.

Transponder 301 then processes alarm signal 315, indicating the network failure 314 detected at transponder 311, in accordance with the value of its configuration property 121. Since its configuration property is set to a propagation value, transponder 301 propagates alarm signal 304 to transponder 305, without generating a new alarm signal. Transponder 305 then processes the alarm signal in accordance with the value of its configuration property, which in this example is set to a propagation value. Thus, transponder 305 propagates alarm signal 304 as alarm signal 308 to transponder 321, without generating a new alarm signal.

Since in this example transponder 321's configuration property 121 is set to a configurable action value specifying that transponder 321 shut off the laser of its port interface 323 if it detects a network failure or alarm signal at its line interface 322, transponder 321 then shuts off the laser of port optical interface 323 in response to detecting the alarm signal, without generating a new alarm signal. Once the laser of port optical interface 323 is shut off, transponder 321 no longer sends signals from port interface 323, and network failure 324 occurs.

Figure 4:
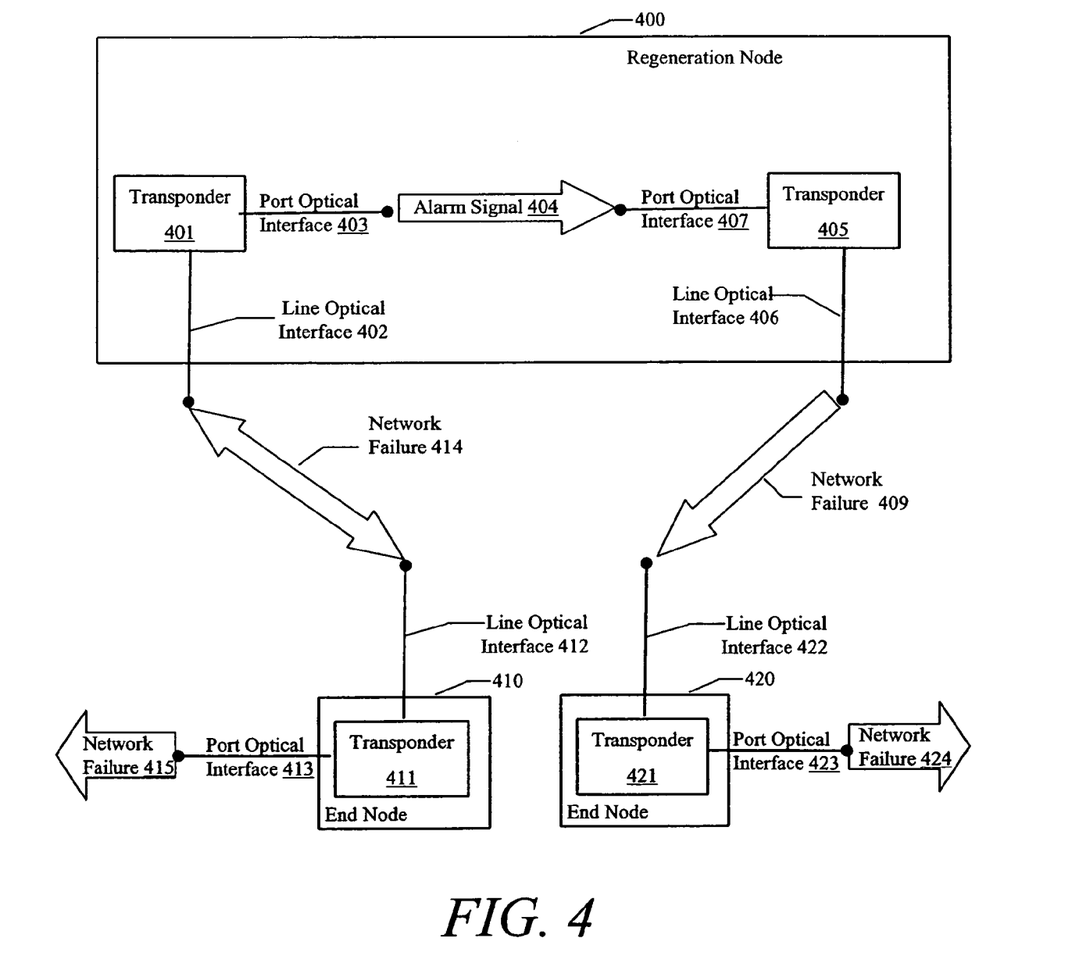
FIG. 4 is a flow diagram depicting the propagation of network failures through a network in accordance with an exemplary embodiment of the invention.

Having described the propagation of an alarm signal through a network in accordance with an exemplary embodiment of the invention, propagation of network failures through a network in accordance with an exemplary embodiment of the invention will now be described in conjunction with FIG. 4. Network failures 409 and 414 include network failures such as loss of signal, loss of frame, or other types of failures described above, although they also may include other predetermined types of failures as well, or in lieu of those described herein. Alarm signal 404 is an alarm indicator signal (e.g., AIS), or any other suitable type of alarm signal, depending on predetermined operating criteria.

According to an exemplary embodiment, regeneration node 400 is the same as regeneration node 200 shown in FIG. 2 and end nodes 410 and 420 are the same as end nodes 210 and 220 shown in FIG. 2, although in other embodiments the nodes 400, 410, and 420 may have other configurations. Regeneration node 400 and end nodes 410 and 420 are preferably connected as shown in FIG. 2. Regeneration node 400 includes two or more transponders 401 and 405 that may be similar to transponder 100 of FIG. 1. Transponders 401 and 405 are interconnected via port optical interfaces 403 and 407. Regeneration node 400 is connected to end node 410 via line optical interfaces 402 and 412. Regeneration node 400 also is connected to end node 420 via line optical interfaces 406 and 422. End nodes 410 and 420 may be connected to other network devices as described above via port optical interfaces 413 and 423, respectively.

In the present example, regeneration node 400 is configured so that transponder 401 or 405 provides an alarm communication to the other transponder if the former transponder detects a network failure or alarm signal, and so that the recipient of the alarm signal in the node 400 shuts off its line interface. The end nodes 410 and 420 are configured to perform a default action. The default action, can be, for example, shutting off a laser at a line interface if a network failure is detected at a port interface, and shutting off a laser at a port interface if a network failure is detected at a line interface.

Since transponders 411 and 421 are configured to perform a default action in response to a network failure, transponders 411 and 421 have their configuration properties 121 set to a "not applicable" value. Transponders 401 and 405 each have their configuration properties 121 set to an action value specifying that the transponders provide an alarm communication through its port interface if a network failure or alarm signal is detected at its line interface, or shut off the laser of its line interface if a network failure or alarm signal is detected at its port interface. The process for these actions will be described in more detail below in the detailed description of FIG. 7.

In operation, transponders 411 and 421 detect network failures 414 and 409, respectively, in the above-described manner, and then respond by processing the network failures 414 and 409 in accordance with the value of their configuration properties. Since in this example, transponders 411 and 421 have their configuration properties set to a "not applicable" value, transponders 411 and 421 perform a default action. The operation of the default action can be similar to the laser shut off action described above in the Description of the Related Art, and shown in FIG. 9. For example, transponders 411 and 421 can respond to network failures 414 and 409, by generating an alarm signal and shutting off the laser of port optical interfaces 413 and 423, respectively, thereby creating network failures 415 and 424.

Transponder 401 also detects network failure 414. For example, line optical interface 402 detects the failure 414 using any suitable known failure detection technique, such as by detecting an absence of light (loss of signal) or one or more frames as described above, and the like. Since in this example transponder 401's configuration property 121 is set to a configurable action value specifying that transponder 401 provide an alarm communication through its port interface 403 upon detecting a network failure or alarm signal at its line interface 402, transponder 401 then generates and forwards alarm signal 404 to transponder 405 via interface 403.

Since in this example transponder 405's configuration property 121 is set to a configurable action value specifying that transponder 405 shut off the laser of its line interface 406 if it is detected that its port interface 407 receives a network failure or alarm signal, transponder 405 then shuts off the laser of line optical interface 406 in response to detecting the alarm signal 404. Once the laser of line optical interface 406 is shut off, transponder 405 no longer sends signals from line interface 406, and network failure 409 occurs.

Figure 5:
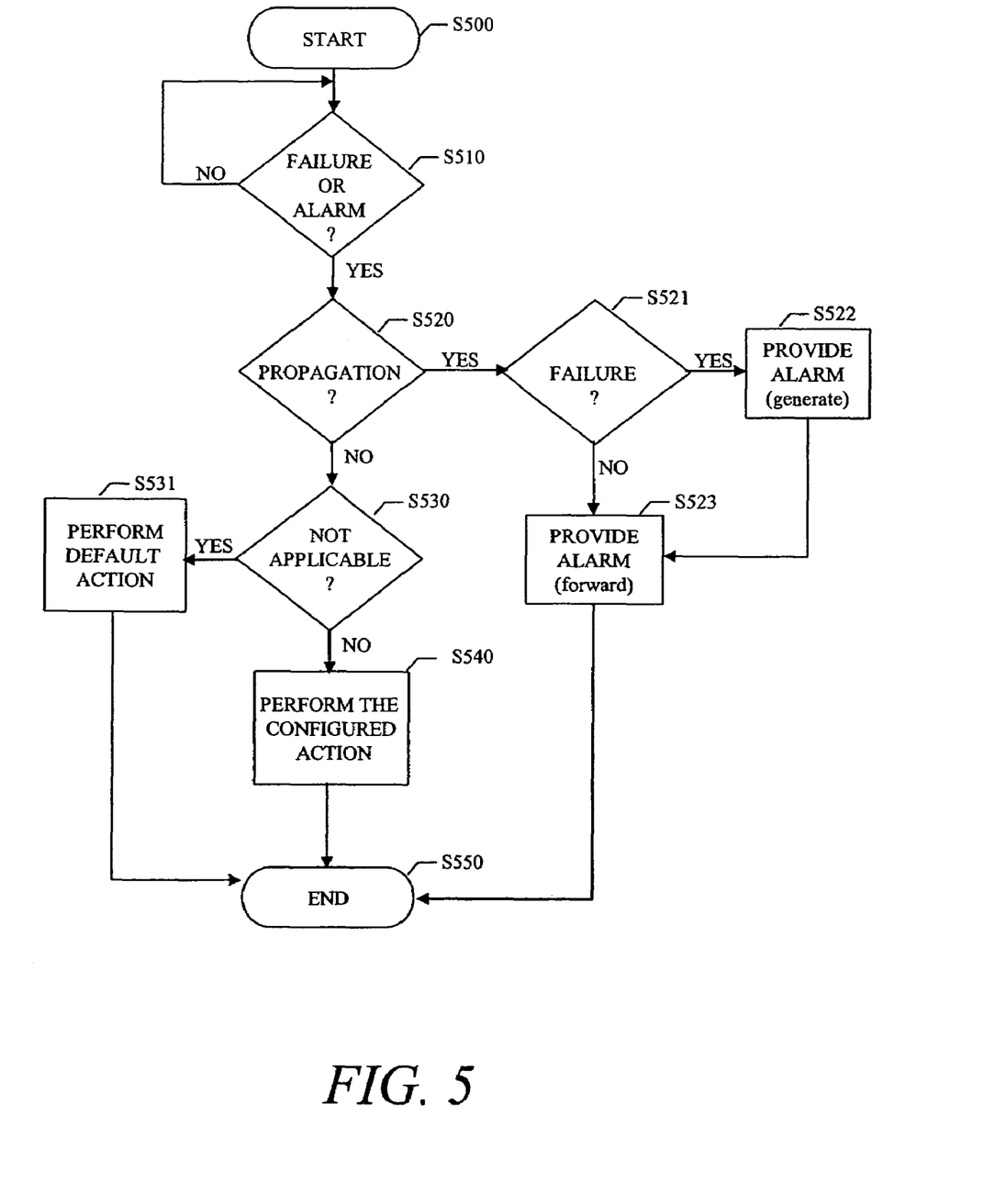
FIG. 5 is a flowchart depicting a process for handling network failures and alarm signals in accordance with an exemplary embodiment of the invention.

FIG. 5 will now be described. FIG. 5 is a flowchart depicting a process performed by a transponder (such as, e.g., transponders 301, 305, 311, or 321 of FIG. 3 or transponders 401, 405, 411, or 421 of FIG. 4) for handling network failures and alarm signals in accordance with an exemplary embodiment of the invention. In block S500, the method starts and proceeds to block S510, where the transponder continuously monitors for whether a network failure or alarm signal is detected.

If either a network failure or alarm signal is detected ("YES" at block S510), processing proceeds to block S520 where the transponder determines whether the transponder's configuration property is set to a propagation value. If the transponder's configuration property is set to a propagation value, as may be the case for, e.g., a regeneration node transponder, processing proceeds to block S521 where the transponder determines whether the event detected in block S510 is a network failure or an alarm signal.

If the event is a network failure ("YES" at block S521), processing proceeds to block S522 where the transponder provides an alarm communication. In this example, the communication is provided by generating the alarm communication, in which case processing then proceeds to block S523 where the alarm signal generated in block S522 is forwarded from the transponder through the network. After the alarm signal has been forwarded, processing proceeds to block S550 and ends.

If the event is an alarm signal ("NO" at block S521), processing proceeds to block S523 where the alarm signal detected at block S510 is provided from the transponder, by forwarding it through the network without generating a new alarm signal. After the alarm signal has been so provided, processing proceeds to block S550 and ends.

If the transponder's configuration property is not set to a propagation value ("NO" at block S520), as may be the case for, e.g., an end node transponder, processing proceeds to block S530 where the transponder determines whether its configuration property is set to a "not applicable" value. If the transponder's configuration property is set to a "not applicable" value, processing proceeds to block S531 where the transponder performs a default action. For example, the default action may include performing an action specified by a network protocol, such as generating an alarm signal and shutting off a laser if a network failure is detected, as described above. After the transponder performs the default action, processing proceeds to block S550 and ends.

If the transponder's configuration property is not set to a "not applicable" value ("NO" at block S530), as also may be the case for, e.g., an end node and/or regeneration node transponder, processing proceeds to block S540 where the transponder performs one or more configurable actions. For example, at least one action may include an action wherein the transponder shuts off a laser of its port interface if a detected network failure or an alarm signal is obtained by way of the transponder's line interface (or vice versa) and/or providing an alarm communication through the line interface (or port interface) if the detected network failure or alarm signal is obtained through the port interface (or line interface), or any other appropriate type of configurable action, depending on the configurable action value of the transponder's configuration property. After the transponder performs the configurable action, processing proceeds to block S550 and ends.

Figure 6:
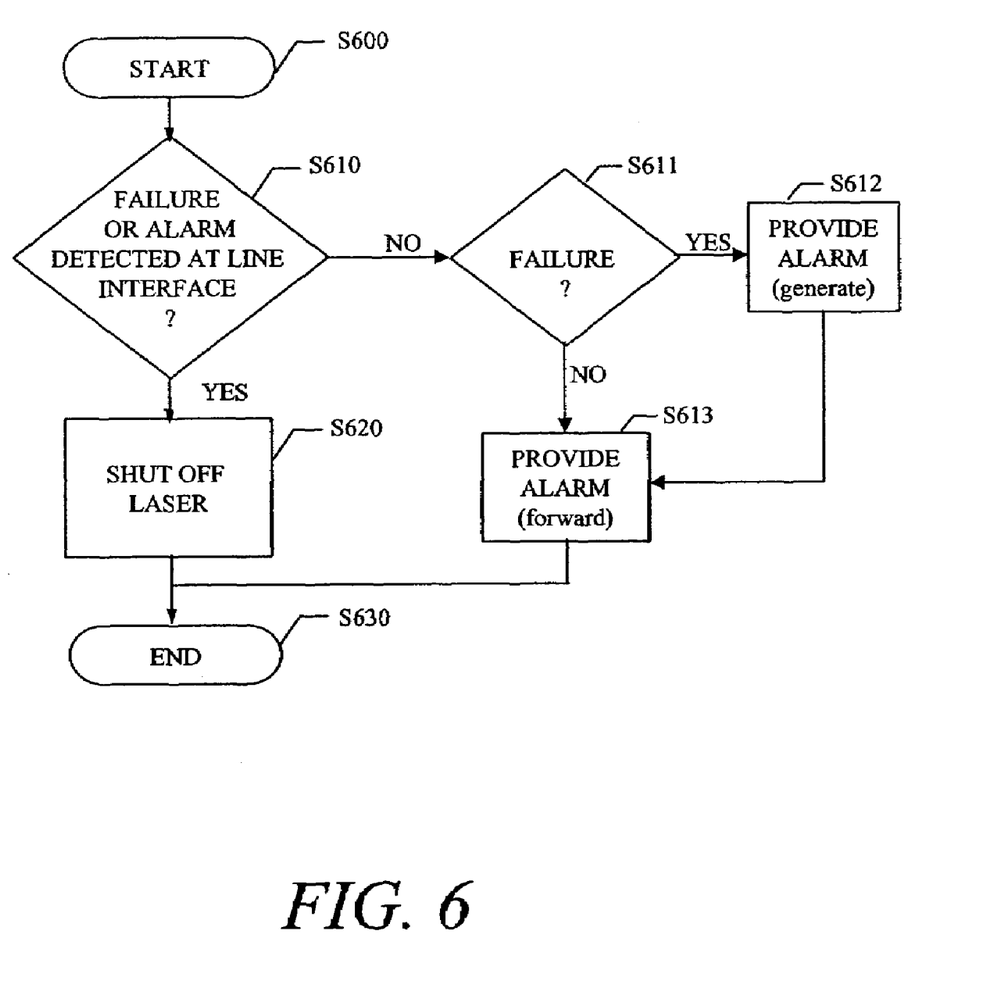
FIG. 6 is a flowchart depicting a process for performing an end node laser shut off action in accordance with an exemplary embodiment of the invention.

FIG. 6 is a detailed flowchart depicting in more detail the process of block S540 of FIG. 5 for an end node. In this example, the transponder's configuration property is set to a configurable action value for shutting off the laser of its port interface if a detected network failure or an alarm signal was obtained by way of the transponder's line interface, and providing an alarm communication through the line interface if the detected network failure or alarm signal was obtained through the port interface.

In block S600, the process starts. Processing then proceeds to block S610 where the transponder determines whether the network failure or alarm signal detected in block S510 (FIG. 5) was obtained by way of the transponder's port interface or line interface.

If the network failure or alarm signal was detected by way of the line optical interface ("YES" at block 610), processing then proceeds to block S620 where the transponder's processor processes a laser shut off instruction and shuts off the laser of the transponder's port optical interface. After the laser is shut off, processing proceeds to block S630 and ends.

If the network failure or alarm signal was detected by way of the port optical interface ("NO" at block S610), processing then proceeds to block S611 where the transponder determines whether the event detected in block S510 is a network failure or an alarm signal.

If the event is a network failure, processing proceeds to block S612 where the transponder provides an alarm signal (communication) by, for example, generating the signal. Processing then proceeds to block S613 where the alarm signal generated in block S612 is sent from the transponder through the network. After the alarm signal has been sent, processing proceeds to block S630 and ends.

If the event is an alarm signal ("NO" at block S611), processing proceeds to block S613 where the alarm signal detected at block S510 is provided from the transponder by, for example, forwarding it through the network without generating a new alarm signal. After the alarm signal has been so provided, processing proceeds to block S630 and ends.

Figure 7:
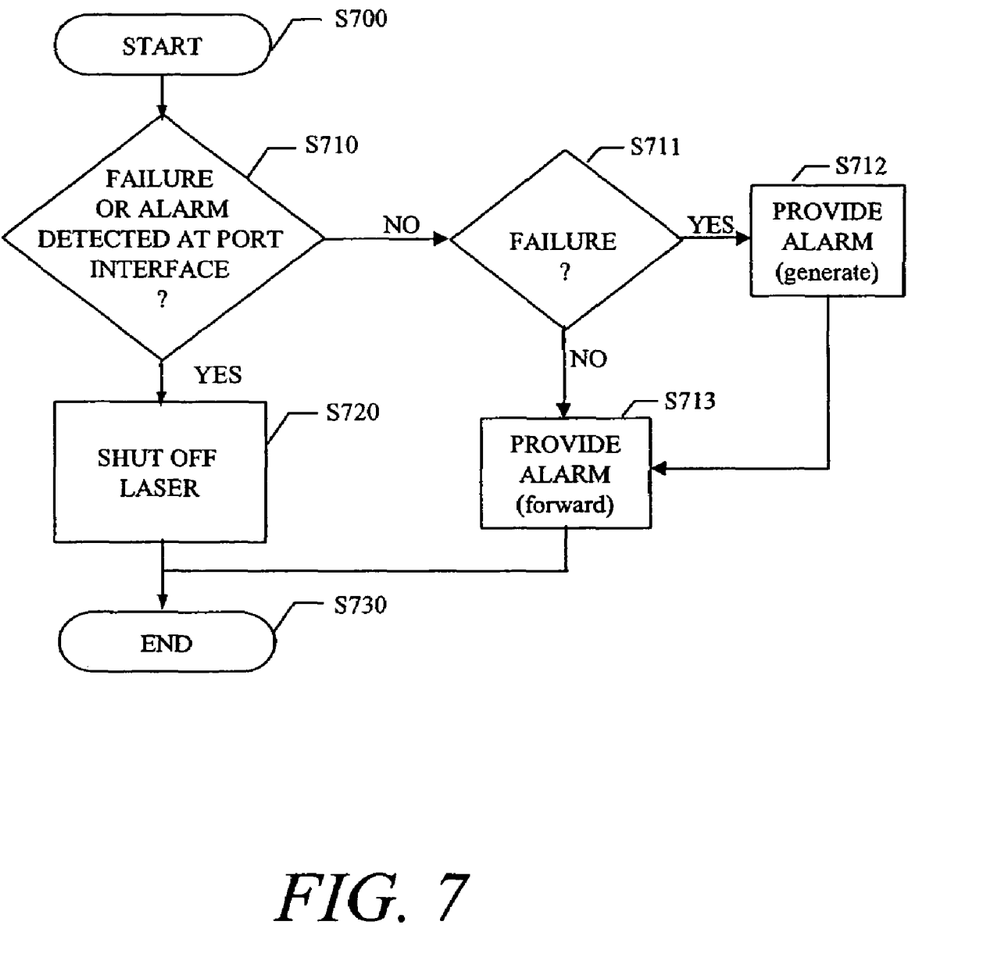
FIG. 7 is a flowchart depicting a process for performing a regeneration node laser shut off action in accordance with an exemplary embodiment of the invention.

FIG. 7 is a detailed flowchart depicting in more detail the process of block S540 of FIG. 5 for a regeneration node. In this example, the transponder's configuration property preferably is set to a configurable action value for shutting off the laser of the transponder's line interface if a detected network failure or an alarm signal was obtained by way of the transponder's port interface, and providing an alarm communication through the port interface if the detected network failure or alarm signal was obtained by way of the line interface.

In block S700, the process starts. Processing then proceeds to block S710 where the transponder determines whether the network failure or alarm signal detected in block S510 (FIG. 5) was obtained by way of the transponder's port interface or line interface.

If the network failure or alarm signal was detected by way of the port optical interface, processing then proceeds to block S720 where the transponder's processor processes a laser shut off instruction and shuts off the laser of the transponder's line optical interface. After the laser is shut off, processing proceeds to block S730 and ends.

If the network failure or alarm signal was detected by way of the line optical interface ("NO" at block S710), processing then proceeds to block S711 where the transponder determines whether the event detected in block S510 (FIG. 5) is a network failure or an alarm signal.

If the event is a network failure, processing proceeds to block S712 where the transponder provides an alarm signal (communication) by, for example, generating the signal. Processing then proceeds to block S713 where the alarm signal generated in block S712 is sent from the transponder through the network. After the alarm signal has been sent, processing proceeds to block S730 and ends.

If the event is an alarm signal ("NO" at block S711), processing proceeds to block S713 where the alarm signal detected at block S510 is provided from the transponder by, for example, forwarding it through the network without generating a new alarm signal. After the alarm signal has been so provided, processing proceeds to block S730 and ends.

Figure 8:
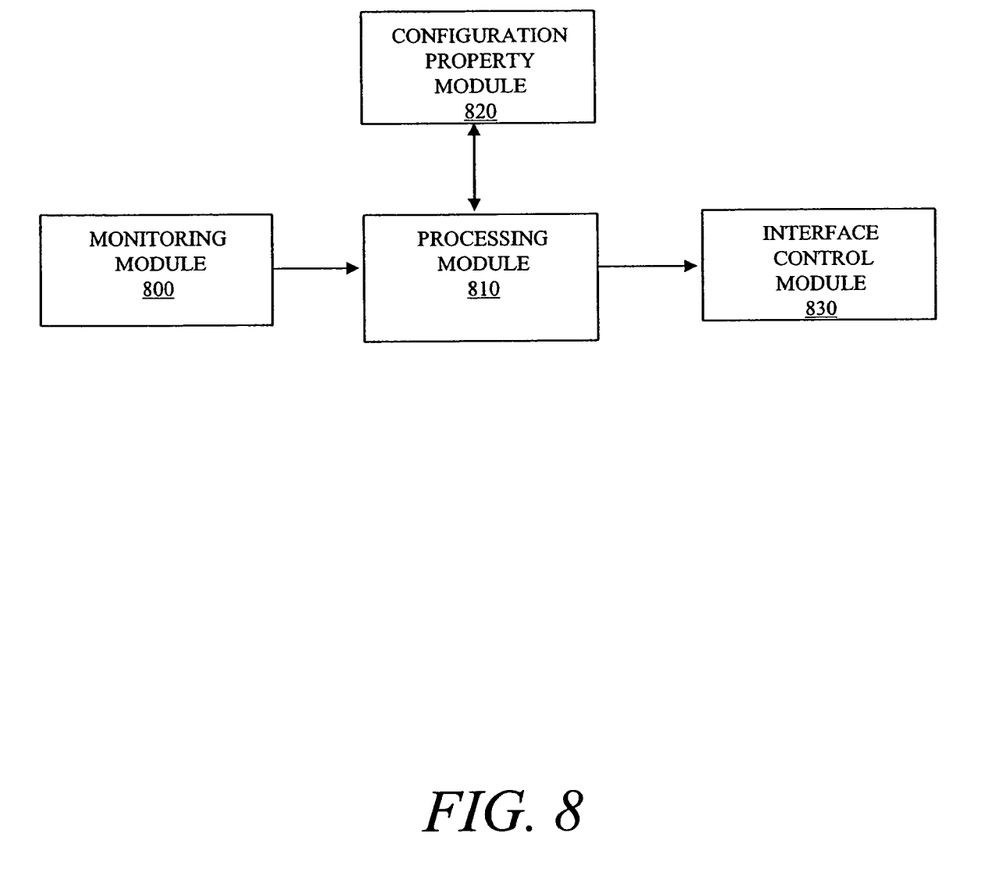
FIG. 8 is a logical diagram of modules in accordance with an exemplary embodiment of the invention.

FIG. 8 is a logical diagram of modules in accordance with an exemplary embodiment of the invention. The modules may be of a transponder that can be similar to transponder 100 of FIG. 1. The modules may be implemented using hardcoded computational modules or other types of circuitry, or a combination of software and circuitry modules.

Monitoring module 800 monitors data, network failures, status messages, and maintenance instructions received at either optical communication interface 130 or 140 shown in FIG. 1. Monitoring module 800 can detect if a failure or alarm signal is detected by way of a port interface or a line interface of the monitored communication interfaces.

Interface control module 830 controls optical communication interfaces 130 and 140 by processing interface commands. Interface commands may be, for example, commands to send data, commands to shut off the optical interface's laser, or any other suitable type of maintenance command.

Configuration property module 820 stores and retrieves configuration property 121 of FIG. 1 in response to requests from processing module 810.

Processing module 810 processes failures or alarm signals detected by monitoring module 800, based on the configuration property retrieved from configuration property module 820, and sends the appropriate interface commands, if any, to interface control module 830.

In operation, if monitoring module 800 detects a network failure or an alarm signal, it responds by notifying processing module 810 that it has detected either the failure or alarm signal. Processing module 810 then responds by issuing a request to configuration property module 820 for retrieving the value of configuration property 121. Upon receiving the request to retrieve the value of configuration property 121, configuration property module 820 sends the value of configuration property 121 to processing module 810.

If the value of configuration property 121 is a propagation value, processing module 810 sends interface control module 830 an interface command for providing an alarm signal (communication), and interface control module 830 provides the alarm signal (communication). If the value of configuration property 121 is a "not applicable" value, processing module 810 sends interface control module 830 an interface command for executing a default action as described above, and interface control module 830 (or another predetermined component) executes the default action. If the value of configuration property 121 is a configurable action value, processing module 810 sends interface control module 830 an interface command for executing a configured action as described above, and interface control module 830 executes the configured action.

As an example, the value of configuration property 121 may specify that processing module 810 send to interface control module 830 an interface command for providing an alarm signal (communication) if monitoring module 800 detects a network failure or an alarm signal at a port interface, or shut off a laser if monitoring module 800 detects a network failure or an alarm signal at a line interface.

As can be appreciated in view of the foregoing description, preferred embodiments of the invention can decrease the number of alarm signals generated in the network and laser shut offs when a network failure is propagated through the network. For example, in accordance with an aspect of the preferred embodiments, transponders can be configured so that they do not always generate an alarm signal and shut off a laser when they detect a network failure. Transponders in end nodes can be configured such that they provide an alarm communication and/or shut off a laser, depending upon which interface detects a network failure or receives an alarm signal. Also, transponders in regeneration nodes can be configured such that they provide alarm signals with or without generating new alarm signals or shutting off lasers, although they may be configured otherwise as deemed appropriate based on the network configuration. In this manner, the number of alarm signals and laser shut offs can be reduced when a network failure is propagated through the network.

In the foregoing description, the invention is described with reference to specific example embodiments thereof. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

Software embodiments of the present invention may be provided as a computer program product, or software, that may include an article of manufacture on a machine accessible or machine readable medium (memory) having instructions. The instructions on the machine accessible or machine readable medium may be used to program a computer system or other electronic device. The machine-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "memory", "machine accessible medium", or "machine readable medium" where used herein (if at all) shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While the invention has been particularly shown and described with respect to preferred embodiments thereof, it should be understood that the embodiments have been presented by way of examples, and not limitations. It will be apparent to persons skilled in the relevant art(s) that various changes in form and detail can be made therein without departing from the spirit and scope of the present invention. Thus, the present invention should not be limited by any above-described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. An optical transponder that can communicate with a network, comprising:
    at least one communication interface coupled to the network, the at least one communication interface including plural interfaces;
    a memory storing instructions and at least one configuration property; and
    a processor, operable under the control of the instructions, and being responsive to a failure or alarm signal detected through any of the interfaces, by performing at least one of a predetermined action and providing an alarm communication through the at least one communication interface, based on the configuration property and depending on which specific interface the failure or alarm signal is detected through, to thus distinguish between a failure or alarm signal detected by way of one interface versus another interface, wherein the configuration property specifies at least one of the providing and the predetermined action.

2. The transponder according to claim 1, wherein the predetermined action includes at least one of a default action and a configurable action.

3. The transponder according to claim 2, wherein the default action includes an action defined by a network protocol.

4. The transponder according to claim 1, wherein the plural interfaces comprise a first communication interface and a second communication interface.

5. The transponder according to claim 4, wherein the first communication interface and the second communication interface are optical communication interfaces.

6. The transponder according to claim 5, wherein at least one of the optical communication interfaces comprises at least one of an optical transmitter unit and an optical receiver unit.

7. The transponder according to claim 6, wherein the optical transmitter unit comprises a laser.

8. The transponder according to claim 1, wherein the plural interfaces include first and second communication interfaces, the predetermined action includes a configurable action, and the configurable action includes at least one of providing an alarm from the transponder if a failure or alarm signal is detected by way of the first communication interface, and shutting off a laser if a failure or alarm signal is detected by way of the second communication interface.

9. A method of operating an optical transponder that can communicate with a network, the transponder having plural communication interfaces, the method comprising:
    monitoring the communication interfaces for at least one of a failure or an alarm signal; and
    in response to detecting a failure or alarm signal through any communication interface, performing at least one of a predetermined action and providing an alarm communication to the network, based on a configuration property and depending on which specific communication interface the failure or alarm signal is detected through, to thus distinguish between a failure or alarm signal detected by way of one communication interface versus another communication interface, wherein the configuration property specifies at least one of the providing and the predetermined action.

10. The method according to claim 9, wherein the predetermined action includes at least one of a default action and a configurable action.

11. The method according to claim 10, wherein the default action includes an action defined by a network protocol.

12. The method according to claim 10, wherein the configurable action includes at least one of providing an alarm from the transponder if a failure or an alarm signal is detected at a first one of the communication interfaces of the transponder, and shutting off a laser if a failure or an alarm signal is detected at a second one of the communication interfaces of the transponder.

13. The method according to claim 9, wherein the configuration property specifies at least one of a configurable action value for performing a configurable action, a "not applicable" value for performing a default action, or a propagation value for providing an alarm communication.

14. An optical communication system, comprising:
    a plurality of interconnected optical transponders, each transponder configured to monitor for at least one of a failure or an alarm signal being detected by way of at least one communication interface of the transponder, and being responsive to detecting at least one of the failure or alarm signal by performing at least one of a predetermined action and providing an alarm communication through the at least one communication interface towards another transponder, based on a configuration property and depending on a specific location of the transponder in the system, to thus distinguish between a failure or alarm signal detected by that transponder versus by another one of the transponders, wherein the configuration property specifies at least one of the providing and the predetermined action.

15. The system according to claim 14, wherein the predetermined action includes at least one of a default action and a configurable action.

16. The system according to claim 14, wherein the transponders comprise at least one first transponder associated with a regeneration node and at least one second transponder associated with an end node,
   wherein the at least one first transponder responds to detecting at least one of the failure or alarm signal by providing the alarm communication,
   wherein the at least one second transponder responds to detecting at least one of the failure or alarm signal by performing the predetermined action, and wherein the predetermined action includes at least one of providing an alarm and shutting off a laser.

17. Computer-executable program instructions stored on a computer-readable medium, the computer-executable program instructions executable to perform a method of operating an optical transponder that can communicate with a network, the transponder having plural communication interfaces, the method comprising:
   monitoring the communication interfaces for at least one of a failure and an alarm signal; and
   in response to detecting a failure or alarm signal through any communication interface, performing at least one of a predetermined action and providing an alarm communication to the network, based on a configuration property and depending on which specific communication interface the failure or alarm signal is detected through, to thus distinguish between a failure or alarm signal detected by way of one communication interface versus another communication interface, wherein the configuration property specifies at least one of the providing and the predetermined action.

* * * * *

UNITED STATES PATENT AND TRADEMARK OFFICE
CERTIFICATE OF CORRECTION

| | |
|---|---|
| PATENT NO. | : 7,663,480 B2 |
| APPLICATION NO. | : 11/652796 |
| DATED | : February 16, 2010 |
| INVENTOR(S) | : Philip J. Santoro et al. |

It is certified that error appears in the above-identified patent and that said Letters Patent is hereby corrected as shown below:

ON COVER PAGE [57] ABSTRACT

Line 17, "shut offs" should read --shutoffs--.

COLUMN 2

Line 4, "shut off" should read --shutoff--.
    Line 15, "shut off" should read --shutoff--.
    Line 63, "shut off" should read --shutoff--.

COLUMN 3

Line 26, "shut off" should read --shutoff--.
    Line 29, "shut off" should read --shutoff--.

COLUMN 4

Line 38, "herein below" should read --hereinbelow--.

COLUMN 9

Line 15, "shut off" should read --shutoff--.

COLUMN 10

Line 51, "block 610)," should read --block S610),--.
    Line 53, "shut off" should read --shutoff--.

Signed and Sealed this

Fourth Day of May, 2010

David J. Kappos
*Director of the United States Patent and Trademark Office*

COLUMN 11

Line 24, "shut off" should read --shutoff--.

COLUMN 12

Line 38, "shut off" should read --shutoff--.
    Line 51, "shut offs" should read --shutoffs--.

COLUMN 14

Line 57, ""not applicable" should read --"not applicable"--.
    Line 58, ""value" should read --value--.